United States Patent
Drummond

(10) Patent No.: US 7,552,606 B2
(45) Date of Patent: Jun. 30, 2009

(54) APPARATUS AND METHOD FOR PREVENTING A VEHICLE FROM BEING DRIVEN AWAY FROM A LOADING BAY

(75) Inventor: Michael Drummond, Hillingdon (GB)

(73) Assignee: Castell Safety International Limited, London (GB)

( * ) Notice: Subject to any disclaimer, the term of this patent is extended or adjusted under 35 U.S.C. 154(b) by 591 days.

(21) Appl. No.: 10/858,001

(22) Filed: Jun. 1, 2004

(65) Prior Publication Data
US 2005/0161293 A1 Jul. 28, 2005

(30) Foreign Application Priority Data
Jun. 3, 2003 (GB) ............................ 0312735.4
Dec. 22, 2003 (GB) ............................ 0329630.8

(51) Int. Cl.
E05B 73/00 (2006.01)
(52) U.S. Cl. ............... 70/14; 70/19; 70/57; 70/160; 70/237
(58) Field of Classification Search ............ 70/14, 70/19, 57, 160, 163, 166–169, 237, 258, 70/389, 416
See application file for complete search history.

(56) References Cited

U.S. PATENT DOCUMENTS

| 4,226,103 A | 10/1980 | Strickland |
|---|---|---|
| 4,325,237 A | 4/1982 | Menzie |
| 4,693,096 A | 9/1987 | Mercer |
| 4,732,018 A * | 3/1988 | Crosby ............... 70/14 |
| 4,738,126 A | 4/1988 | Haberle |
| 5,076,077 A | 12/1991 | Renne |
| 5,129,243 A * | 7/1992 | Kassebaum ............... 70/14 |
| 5,239,848 A * | 8/1993 | Nichols, Jr. ............... 70/14 |
| 5,410,894 A * | 5/1995 | Fox et al. ............... 70/14 |
| 5,675,997 A | 10/1997 | Hulak |
| 6,120,064 A * | 9/2000 | McNamara ............ 285/38 |
| 6,164,893 A | 12/2000 | Glomot et al. |

FOREIGN PATENT DOCUMENTS

| EP | 0 537 075 A | 4/1993 |
|---|---|---|
| FR | 2 256 891 A | 8/1975 |

* cited by examiner

Primary Examiner—Patricia L Engle
Assistant Examiner—Christopher Boswell
(74) Attorney, Agent, or Firm—Gottlieb, Rackman & Reisman, P.C.

(57) ABSTRACT

A vehicle includes a coupling assembly for connecting first and second sections of a brake supply line, the coupling assembly comprising complementary first and second couplings which fit together. A safety device is complementary to one coupling and which can be fitted to the coupling so that it cannot be connected to the other coupling. The safety device includes a locking device which is operable to prevent removal of the safety device from the coupling; the locking device prevents removal of a key until the locking device is operated. The key removed from the locking device can be used to enable use of a loading bay.

5 Claims, 10 Drawing Sheets

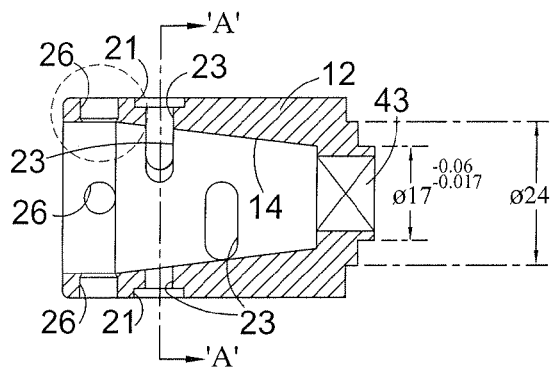
Fig. 5
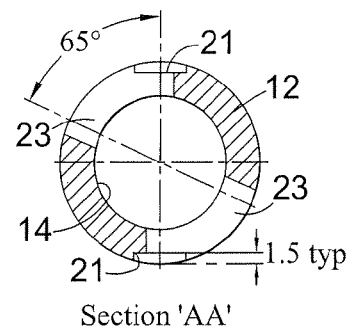
Fig. 6
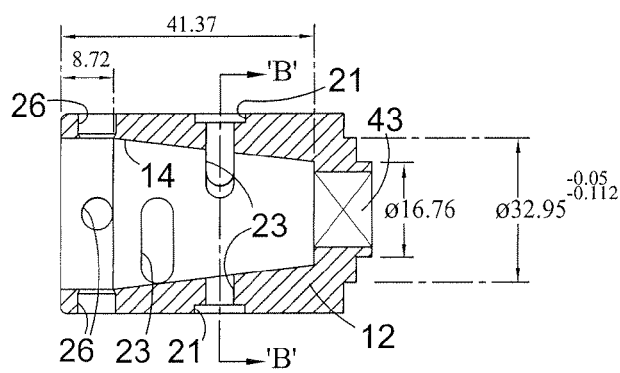
Fig. 7
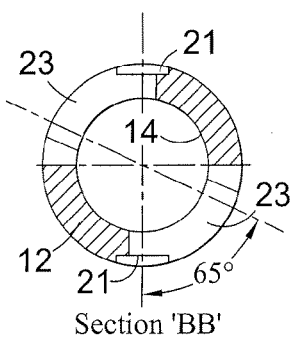
Fig. 8
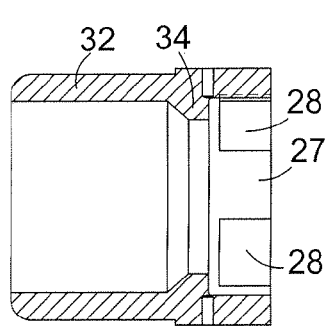
Fig. 9
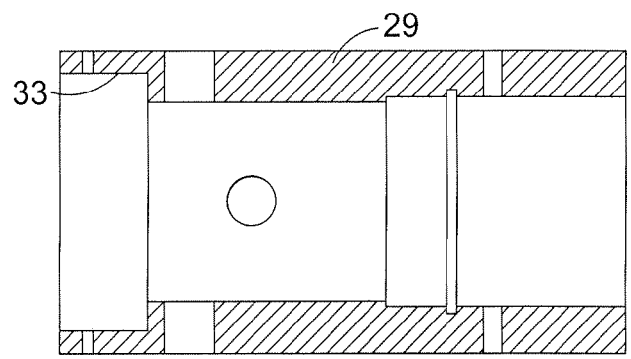

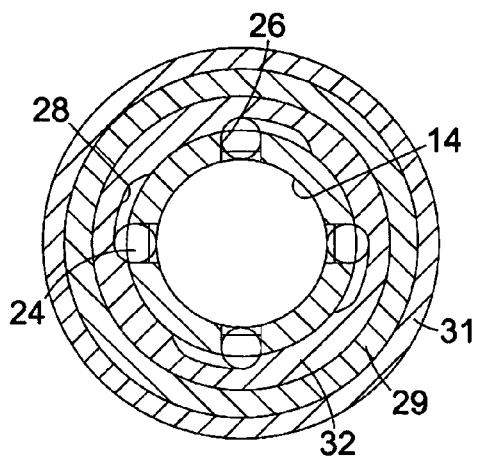
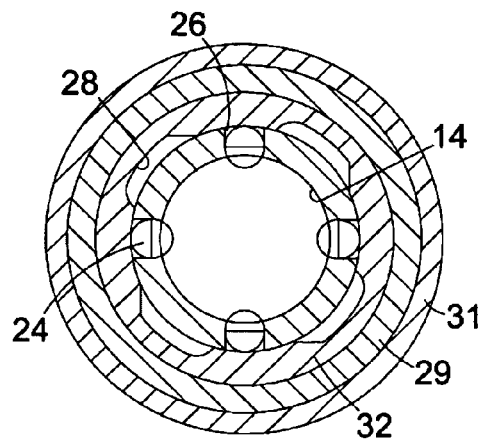
Fig. 10  Fig. 11
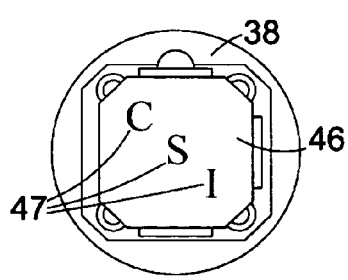
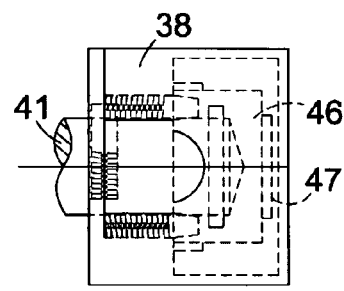
Fig. 12  Fig. 13
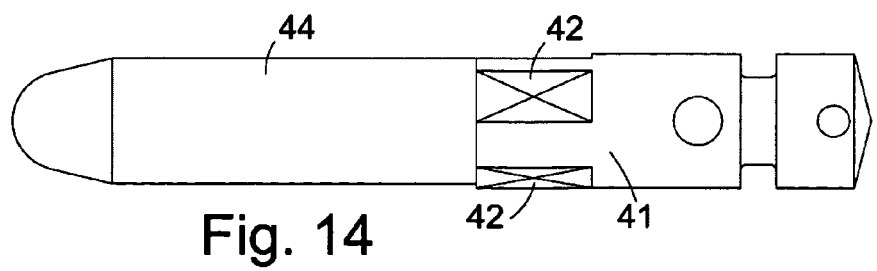
Fig. 14
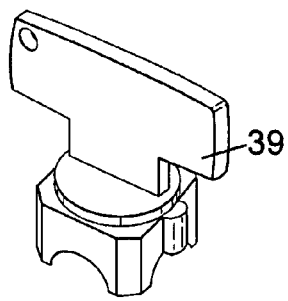
Fig. 15

APPARATUS AND METHOD FOR PREVENTING A VEHICLE FROM BEING DRIVEN AWAY FROM A LOADING BAY

BACKGROUND OF THE INVENTION

1. Field of the Invention

This invention relates to apparatus for preventing a vehicle from being driven away from a loading bay during loading/unloading, and a method for the same purpose.

2. Description of the Related Art

The normal sequence of events is that a vehicle (a semi-trailer, a drawbar trailer, or a lorry) is driven up to a loading bay and the driver contacts staff in the building. The loading bay has a door, usually of the 'up and over' type, and a dock leveller. The dock leveller is a powered ramp which is adjusted in height to accommodate differences in vehicle loading heights and to enable forklifts to drive from the building into the vehicle. To prevent accidents several safeguards are currently employed. Current systems include:

Traffic lights, some of which are linked to the dock leveller. This does not prevent the driver from moving off but relies upon him obeying the lights. These systems are quite expensive.

A traffic barrier system which retains the vehicle at the loading bay until a barrier is raised. This also relies upon correct procedure and is expensive.

An inbuilt wheel blocking device which is installed in the ground at each bay and which is raised to prevent the vehicle from leaving until loading is complete. This is very expensive and also relies upon correct procedure to be effective.

A wheel clamp which is fitted when the vehicle arrives and which provides a physical and visual barrier to indicate to the driver and he/she should not drive off. This also relies upon procedures and is cumbersome to operate.

SUMMARY OF THE INVENTION

The present invention provides apparatus for preventing a vehicle from being driven away from a loading bay during loading/unloading, the apparatus comprising a safety device which is complementary to a coupling on the vehicle and which when fitted to the coupling prevents the vehicle from being driven away. The safety device includes a locking device which is operable to prevent removal of the safety device from the coupling and which prevents removal of a key from the locking device until the locking device is so operated.

The released key can then be used to operate a device, such as a switch or a door lock, to enable the use of a loading bay, this device preventing removal of the key until it is operated to disable use of the loading bay.

The invention also provides a method of preventing a vehicle from being driven away from a loading bay during loading/unloading, comprising the sequential steps of:

applying to a vehicle at a loading bay a safety device which prevents the vehicle from being driven away from the loading bay;

locking the safety device to prevent removal of the safety device, by means of a key which is prevented from being removed from the safety device until the safety device is applied and locked;

removing the key from the locked safety device; and using the key to enable use of the loading bay and simultaneously trapping the key so that it cannot be used to unlock the safety device, the key remaining trapped until it is used to disable use of the loading bay.

In a preferred embodiment the safety device comprises a locking device and first and second coaxial parts which are arranged one inside the other, the first coaxial part having a tapering surface for engaging a complementary surface of the said coupling, the second coaxial part carrying at least one plunger which engages with the first coaxial part to prevent relative rotation of the first and second coaxial parts, the plunger having an extension which extends radially through the first coaxial part and projects from the said tapering surface, the extension being acted on by the said complementary surface, when the safety device is fitted to the said coupling, so as to push the plunger out of engagement with the first coaxial part, thereby allowing relative rotation of the coaxial parts, the first coaxial part carrying a detent element which is radially movable between a projection position, in which it projects from the said tapering surface and is engageable with a circumferentially extending groove in the said complementary surface, and a retracted position, in which it does not so project, the coaxial parts being relative rotatable between a first position, in which the detent element is free to move between its projecting and retracted positions, and a second position, in which the detent element is prevented from moving to its retracted position from its projecting position, the locking device being operable to cause the relative rotation of the coaxial parts.

In another embodiment the safety device includes a coupling part in the form of a palm-type coupling.

The invention will be described further, by way of example only, with reference to the accompanying drawings.

BRIEF DESCRIPTION OF THE DRAWINGS

FIG. 5 is an axial section through an inner coaxial part of the safety device;

FIG. 6 is a section taken on line A-A in FIG. 5;

FIG. 7 is an axial section through the inner coaxial part in a plane at 90° to the plane of FIG. 5;

FIG. 8 is a section taken on line B-B in FIG. 7;

FIG. 9 is an axial section through an outer coaxial part of the safety device, showing a body and an extension axially separated;

FIG. 10 is a cross-section through the safety device, the coaxial parts being in a first relative position;

FIG. 11 is a view similar to FIG. 10, but with the coaxial parts in a second relative position;

FIG. 12 is an end view of a locking device;

FIG. 13 is a side view of the locking device;

FIG. 14 is a side view of a spigot which forms part of the locking device;

FIG. 15 is a perspective view of a key for operating the locking device;

DETAILED DESCRIPTION OF THE PREFERRED EMBODIMENTS

Figure 1:
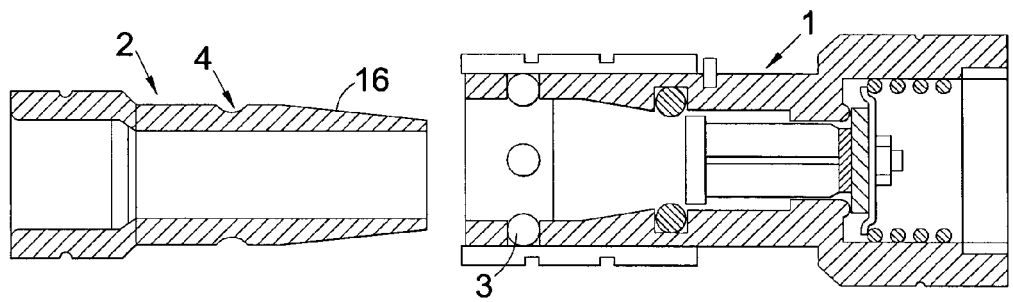
FIG. 1 is an axial section through a standard coupling assembly, showing male and female couplings separated.
Figure 2:
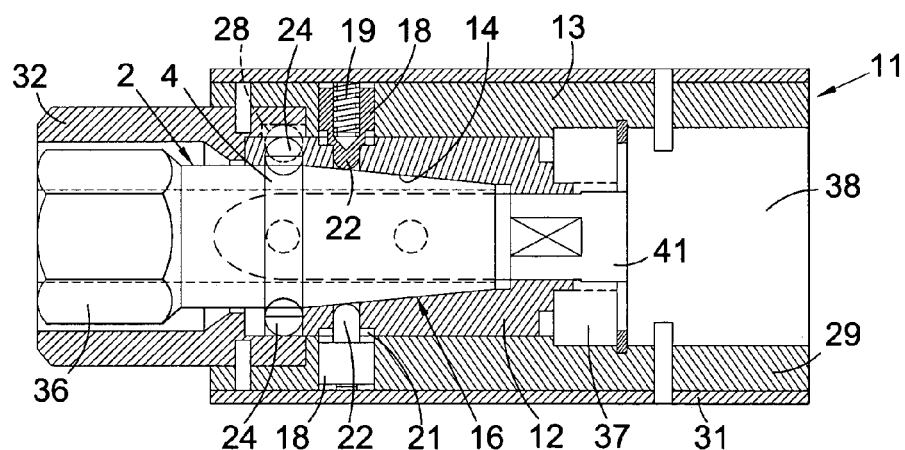
FIG. 2 is an axial section through a safety device fitted on a male coupling similar to that shown in FIG. 1.
Figure 3:
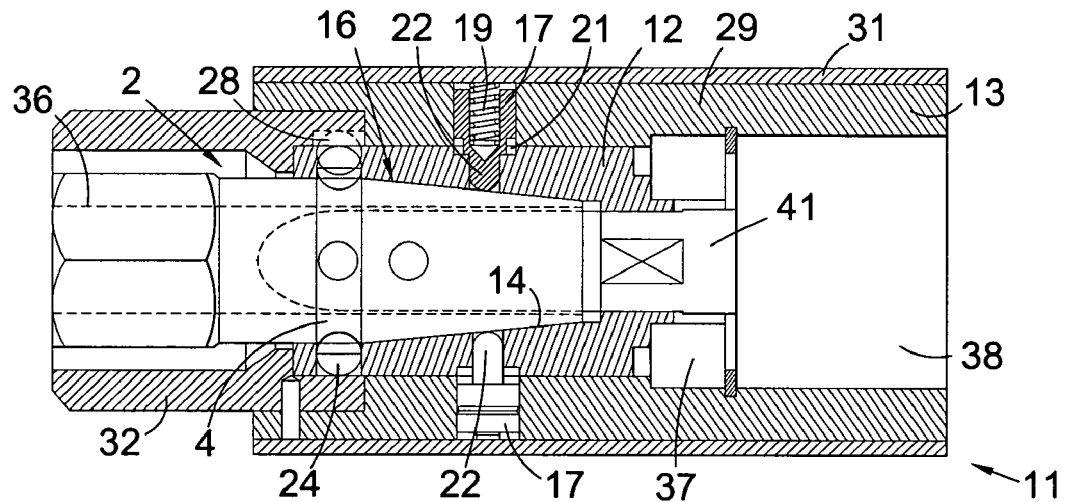
FIG. 3 is an axial section in a plane at 90° to the plane of FIG. 2.

The standard coupling assembly (according to British Standard BS AU 138b:2000) shown in FIG. 1 is for use in the supply line (also called the emergency line) which supplies air under pressure to release a braking device on the trailer unit of an articulated vehicle. In the event that the air supply fails, the braking device is automatically engaged to prevent movement of the trailer unit (or to brake the moving trailer unit). The assembly comprises a first coupling 1 (female coupling) on the end of a flexible hose (not shown), constituting a first supply line section on the tractor unit of the vehicle, and a second coupling 2 (male coupling) on the end of a second supply line section (not shown) provided on the trailer unit. The female coupling 1 has four captive balls 3 which engage in an annular circumferential groove 4 in the male coupling 2. A self-sealing valve 6 in the female coupling 1 is opened by the male coupling 2.

Figure 4:
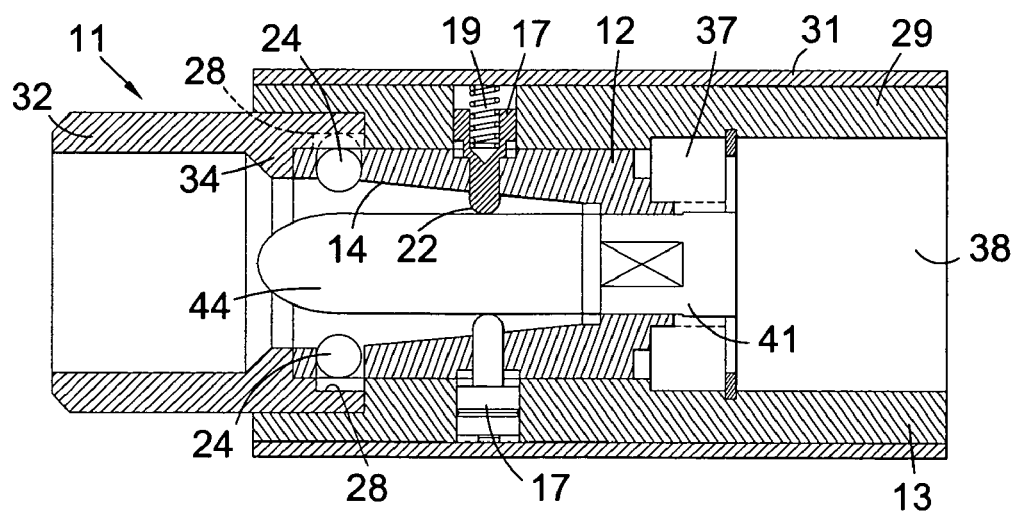
FIG. 4 is a view similar to FIG. 3 but with the safety device not being fitted to the coupling.

FIGS. 2 to 14 illustrate a preferred embodiment of a safety device 11 which can be fitted to the male coupling 2 to prevent the female coupling 1 from being fitted to it, thereby preventing disengagement of the braking device of the trailer unit. The safety device 11 has first and second coaxial parts 12 and 13, one inside the other. The inner part 12 has an internal surface 14 which tapers conically and which is complementary to the outer surface 16 of the male coupling 2. The outer part 13 carries two pairs of diametrically opposite plungers 17, 18, the pairs being both axially and angularly offset (in this example by 90°). The plungers 17, 18 are urged by respective springs 19 to engage (as in FIG. 4) in respective recesses 21 in the inner part 12, thereby preventing relative rotation of the parts 12, 13.

Each of the plungers 17, 18 has an extension 22 which extends radially through a slot 23 (FIGS. 5 to 8) in the inner part 12 and projects (as in FIG. 4) from the inner surface 14. When the safety device 11 is pushed onto the male coupling 2, the extensions 22 are acted on by the surface 16 so as to push the plungers 17, 18 out of the recesses 21, thereby allowing relative rotation of the parts 12, 13 through an angle (for example 65°) determined by the lengths of the slots 23. The inner part 12 has detent elements in the form of captive balls 24 (in this example, four) which are radially movable in bores 26 (FIGS. 5, 7), each ball 24 being movable between a projecting position (FIG. 11), in which it projects from the inner surface 14 and is engageable with the groove 4, and a retracted position (FIG. 10).

The outer part 13 has an annular inner surface region 27 (FIG. 9) which faces the annular outer surface region of the inner part 12 containing the bores 26 and which has recesses 28. When the parts 12, 13 are in a first relative position (FIGS. 4, 10) the recesses 28 are in register with the bores 26 and the balls 24 are free to move between the projecting and retracted positions. When the parts 12, 13 are in a second relative position (FIG. 11) the recesses 28 are out of register with the bores 26 and therefore the balls 24 are prevented from moving to their retracted positions.

The outer part 13 of the safety device 11 comprises a body 29 (FIG. 9) covered by a sleeve 31 and extended by an extension 32 which fits in a recess 33 in the end of the body 29, has an internal collar 34 against which one end of the inner part 12 abuts, and is adapted to cover a hexagonal base portion 36 of the male coupling 2 in order to prevent or inhibit an unauthorised person from defeating the safety device by disconnecting the coupling 2 from the trailer unit (and attaching a replacement coupling). The extension 32 has the region 27 with the recesses 28. The other end of the inner part 12 abuts against a bearing 37.

The end of the body 29 remote from the extension 32 houses a locking device 38 (lock) operated by a key 39 (FIG. 15) to rotate a spigot 41 having flats 42 which engage corresponding flats 43 in the inner part 12. Accordingly, when the spigot 41 is turned, by turning the key 39 in the lock 38, the inner part 12 is turned relative to the outer part 13. The spigot 41 has an extension 44 which extends beyond the plunger extensions 22, thereby inhibiting access to them.

In the preferred embodiment the lock 38 is a so-called figure lock, which is a commercially available product and in which a rotatable central member 46 (integral with the spigot 41) with raised symbols 47 mates with the key 39 which has an engraved form matching the symbols. When the central member 46 is rotated by the key 39 to the position corresponding to the above-mentioned first position of the parts 12, 13 relative to each other (FIG. 10), so that the safety device 11 can be fitted on or removed from the male coupling 2, the key 39 is trapped in the lock 38. When the central member 46 is rotated by the key 39 to the position corresponding to the second position (FIG. 11), so that the safety device 11 cannot be removed from the male coupling 2, the key 39 can be released from the lock 38 and is therefore free for use with a similar lock on another device (such as a switching device enabling/disabling use of a loading bay). It is to be noted that the plungers 17 prevent movement of the parts 12, 13 from the first position to the second position unless the safety device 11 is fitted on the male coupling 2.

Figure 16:
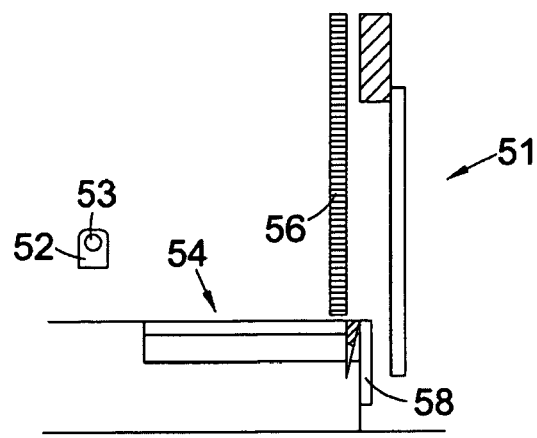
FIG. 16 is a schematic side view of a loading bay.
Figure 17:
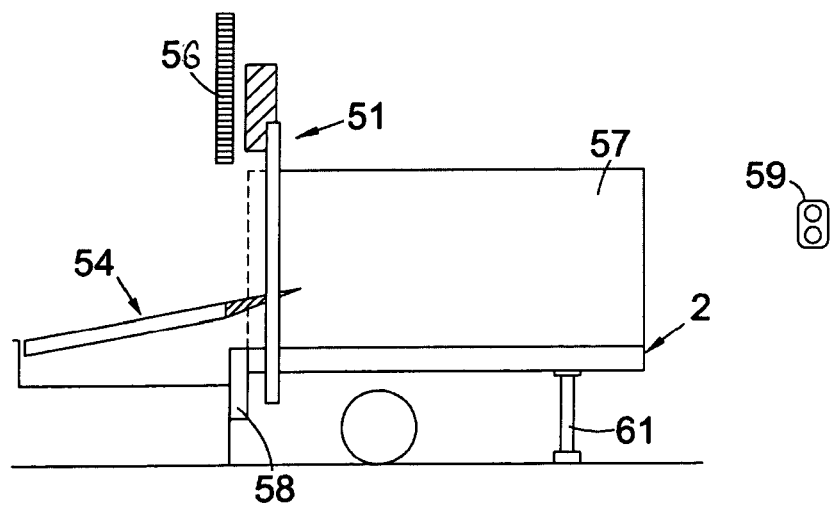
FIG. 17 is a schematic side view of the loading bay in use with a trailer unit.

FIGS. 16 and 17 show a loading bay 51 including a switching device 52 for selectively enabling and disabling the use of the loading bay, the switching device including a lock 53 which is similar to the lock 38 and is operable by the same key 39. The key is trapped by the lock 53 until the lock is turned to disable use of the loading bay 51. The switching device 52 in particular enables and disables a drive for operating a dock leveller 54.

The preferred procedure for loading a trailer unit 57 (FIG. 17) using the above-described safety device 11 is as follows.

1) The driver of the articulated vehicle with the trailer unit 57 arrives in the vicinity of the loading bay 51 and reverses towards the dock leveller 54. The driver gets out of the tractor unit, walks to the back of the trailer unit 57, and opens its doors.

2) The driver contacts a warehouse operative, who walks back to the tractor unit with the driver, bringing with him the safety device 11 in which is trapped the key 39 (having been removed from the disabled switching device 52). The driver then reverses the vehicle further until the trailer unit 57 is at the loading bay 51 (preferably in contact with a buffer 58).

3) The driver disconnects the female coupling 1 from the male coupling 2, thereby disconnecting the brake supply line, with the result that the brakes of the trailer unit 57 lock on.

4) The warehouse operative fits the safety device 11 on the male coupling 2, turns the key 39 to secure the safety device to the coupling 2, and removes the key 39, thereby preventing re-connection of the emergency braking device.

5) The operative inserts the key 39 into the lock 53 of the switching device 52 and turns it. This enables operation of the dock leveller 54. (In addition, this may enable operation of the bay door 56 and/or turn a traffic light 59 from green to red.)

6) Loading or tipping then commences. Meanwhile, the tractor unit of the vehicle can be driven away, if desired. In the example shown in FIG. 17 the trailer unit 57 is a semi-trailer, which is temporarily supported by a frame 61.

7) When loading or tipping has been completed, the switching device 52 is turned off and disabled by turning the key 39, which is then released from the lock 53 and can be used to unlock the safety device 11. Removal of the safety device 11 from the coupling 2 allows the trailer unit 57 to be driven away.

The above-described safety device is of relatively low cost and only requires the fitting of an interlocked switch in the power supply to the dock leveller. Its use ensures that the trailer unit cannot be moved until loading is completed. By physically interlocking the brakes of the trailer unit with the operation of the loading bay, reliance upon procedural compliance is avoided, eliminating the possibility of human error. No modification of the vehicle is required.

Various modifications may be made within the scope of the invention. For example, although the safety device has been described in an embodiment suited to a particular type of coupling, it could be modified to suit other couplings. In particular, if the coupling included a self-sealing valve, the spigot of the locking device could be designed to unseat the valve or to allow the valve to self-seal. The safety device could be used in a brake line other than the emergency line, e.g. in an auxiliary line. Furthermore, a modified safety device could be used on a female coupling, which would require inversion of the functions of the inner and outer coaxial parts of the safety device, as will easily be understood.

The figure lock 38 described above could be replaced by any suitable lock, in particular a high security lock to prevent theft of the trailer unit. The sleeve 31 could be made of hardened steel, or even titanium, to resist attack.

Figure 18:
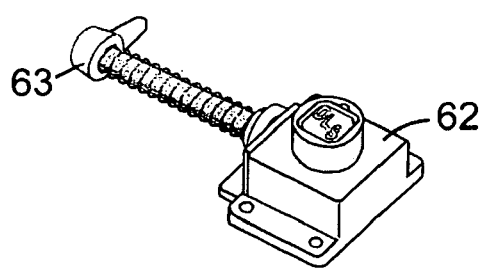
FIG. 18 is a perspective view of a door lock for the door of a loading bay.

The switching device 52 shown in FIG. 16 could be replaced by a door lock 62 (FIG. 18) which is operable by the key 39 and which has a bolt 63 for securing the door 56 of the loading bay 51. The key 39 cannot be released from the door lock 62 until the key 39 has been turned so as to secure the door 56, thereby disabling the loading bay. In another embodiment the door lock may trap a second key, which is released when the first key (39) is turned to unlock the door and which can only then be used to operate an electrical switch, e.g. controlling the supply of power to the dock leveller 54. Alternatively, the door lock may be combined with such a switch.

In another embodiment the key 39 may be used to operate a lock on a communication box providing communication through a wall separating the inside of the loading bay from the outside. The driver inserts the key 39 in the external lock and turns it, thereby trapping the key 39. This action is communicated (electrically or mechanically) to an internal lock, which thereupon releases a second key, for use by an operator in the loading bay, thereby enabling use of the loading bay.

The first key (39) remain trapped until the operator inserts the second key into the internal lock and turns it, thereby trapping the second key. This procedure obviates direct contact between the driver and the operator.

Figure 19:
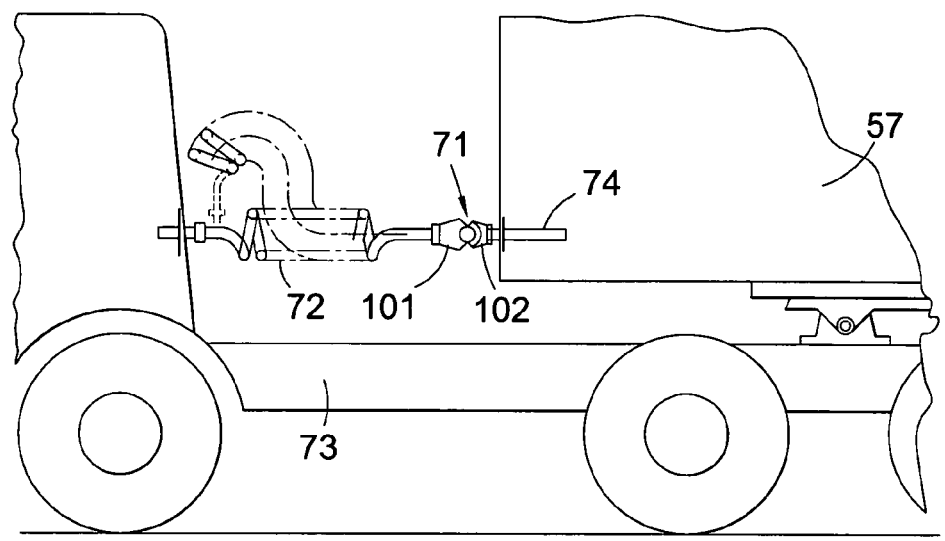
FIG. 19 is a schematic side view of part of an articulated vehicle, showing another type of standard coupling assembly.
Figure 20:
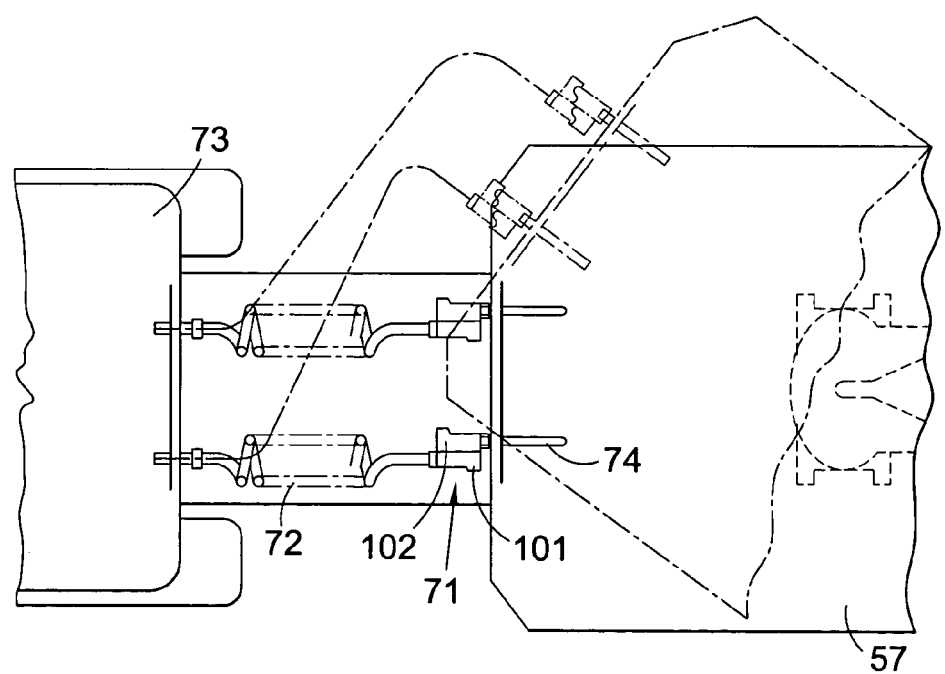
FIG. 20 is a plan view corresponding to FIG. 19.
Figure 21:
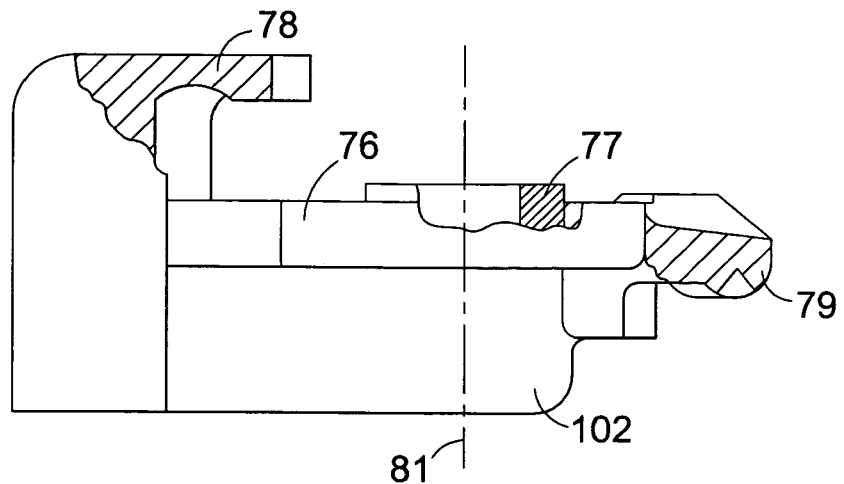
FIG. 21 is a part-sectional plan view of one coupling of the coupling assembly of FIGS. 19 and 20.
Figure 22:
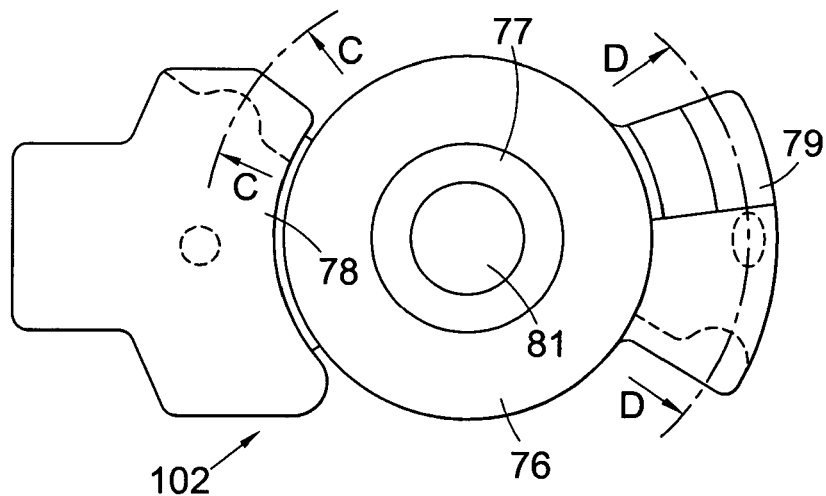
FIG. 22 is a side view of the coupling shown in FIG. 21.
Figure 23:
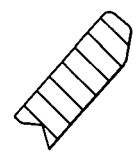
FIG. 23 is a section taken on line C-C in FIG. 22.
Figure 24:
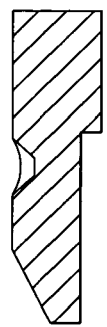
FIG. 24 is a section taken on line D-D in FIG. 23.

The standard coupling assembly 71 (according to International Standard ISO 1728) shown in FIGS. 19 and 20 is in the supply line (emergency line) which supplies air under pressure to release the braking device on the trailer unit 57. The assembly 71 comprises a first coupling 101 on the end of a flexible hose 72, constituting a first supply line section on the tractor unit 73, and a second coupling 102 on the end of a second supply line section 74 provided on the trailer unit 57. A self-sealing valve (not shown) in the first coupling 101 is opened by the second coupling 102.

One of the couplings (the second coupling 102) is shown in FIGS. 21 to 24, the other coupling being similar. Each coupling comprises a body 76 carrying a face seal 77. One side of the body 76 is provided with an integral rim 78 and the diametrically opposite side is provided with an integral projecting spur 79. The two couplings 101, 102 are connected by placing their face seals 77 in the mutual contact and rotating them about their common axis 81 until the spur 79 of each coupling engages under the rim 78 of the other coupling so that the seals 77 are clamped hermetically together. The relative motion of the complementary couplings 101, 102 resembles the rotation of one hand palm against the other, this type of coupling therefore being referred to as a "palm coupling" or a "glad hand coupling".

Figure 25:
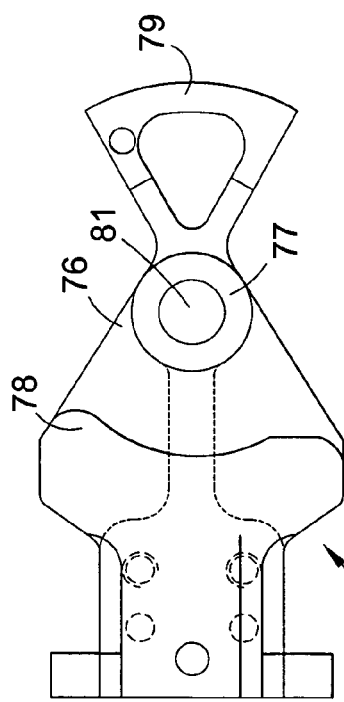
FIG. 25 is a side view of a coupling similar to that shown in FIGS. 21 and 22.

FIG. 25 shows an embodiment of the type of coupling described above with reference to FIGS. 19 to 24, in which similar parts are given the same reference numerals so that further description is not necessary.

It will be appreciated that a safety device according to the present invention for use with a palm coupling as described above, in particular the second coupling 102, will have a body with a rim and a spur similar to those described above and will also have a locking device for locking it to the palm coupling.

Such a safety device is shown in FIGS. 26 to 29. It comprises a coupling part 201 which is complementary to the second coupling 102 (described above) and projects in the axial direction from a generally cylindrical inner part or body 202 which is surrounded by a generally cylindrical outer part or sleeve 203. The coupling part 201 comprises a body portion 204 shaped so as to be complementary to the body 76 of the second coupling 102, a spur portion 206 for engagement with the rim 78, and a rim portion 207 which is to engage the spur 79 and which is connected to the inner body 202.

Figure 26:
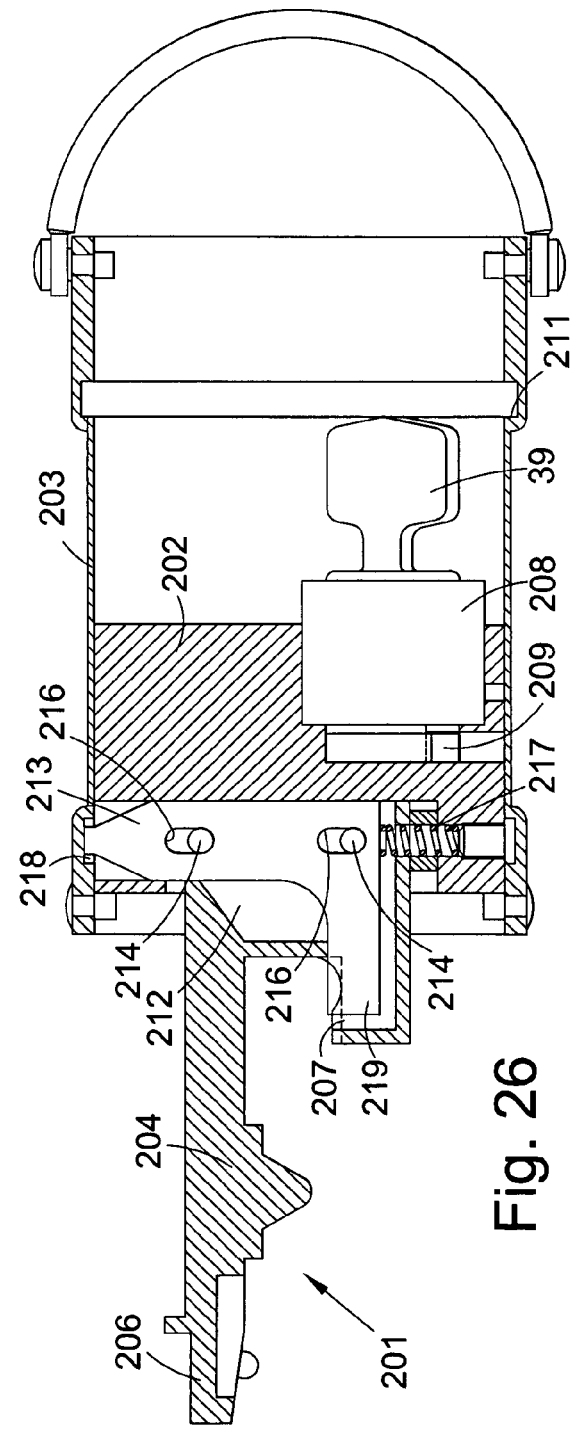
FIG. 26 is a longitudinal section through a safety device for use with the type of coupling shown in FIGS. 19 to 25, before fitting to the coupling.
Figure 27:
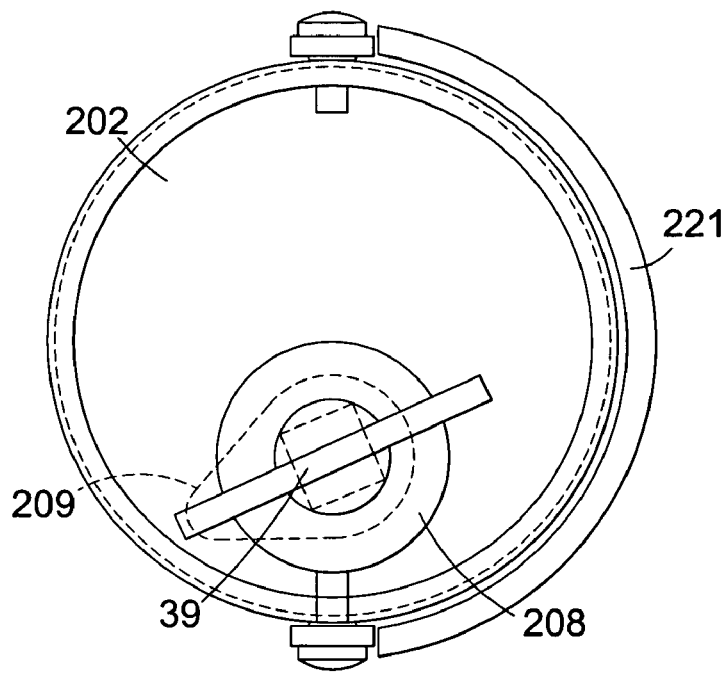
FIG. 27 is an end view of the security device of FIG. 26.
Figure 28:
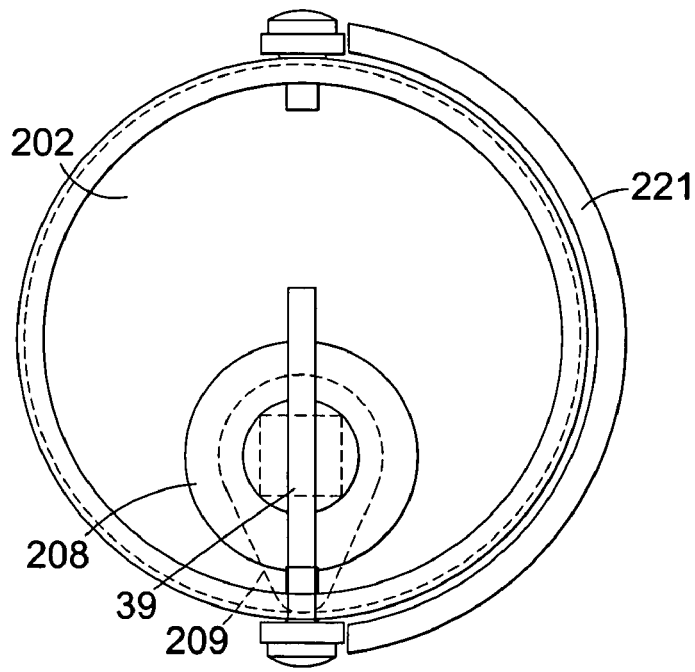
FIG. 28 is an end view similar to FIG. 27, but after the safety device has been fitted to the coupling and a key has been turned to lock the safety device.

The outer sleeve 203 is axially slidable relative to the inner body 202 between a first position (FIG. 26), in which the coupling part 201 is exposed for connection to the coupling 102, and a second position (FIG. 29), in which the sleeve 203 covers the body part 204 (and also the body 76 of the coupling 102) to prevent disconnection of the coupling part 201 from the coupling 102. The inner body 202 carries a figure lock 208 operated by a key 39 as described above. The lock 208 has a locking member 209 which is rotatable (by rotation of the key 39) between a locking position (FIGS. 28 and 29), in which it engages in an annular internal recess 211 in the sleeve 203 to retain the sleeve in its second position (FIG. 29), and an unlocking position (FIGS. 26 and 27). In the latter position the key 39 is trapped in the lock 39. Furthermore, the sleeve 203 when in its first position (FIG. 26) hinders access to the trapped key 39 and also interferes with the key 39 so as to prevent it from being turned to a position in which it is free.

Figure 29:
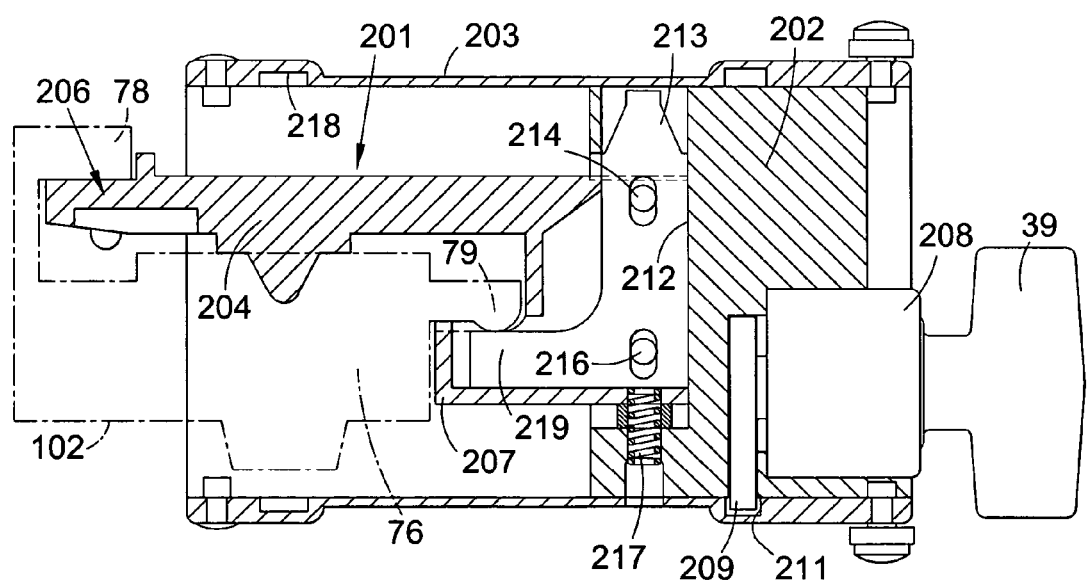
FIG. 29 is a longitudinal section through the safety device, corresponding to FIG. 28.

The inner body 202 and the coupling part 201 define a diametral slot 212 which accommodates a latching plate 213 guided and retained by pins 214 engaging in elongate cut-outs 216. The plate 213 is urged by a compression spring 217 into a latching position (FIG. 26) in which it engages in an annular internal recess 218 in the sleeve 203 in the first position, thereby preventing the sleeve from being moved to the second position (FIG. 29), which would allow the key 39 to be freed. When the coupling part 201 is connected to the coupling 102, the spur 79 acts on an extension 219 of the latching plate 213 so as to move the plate 213 out of engagement with the recess 21, thereby allowing the sleeve 203 to be moved to its second position (FIG. 29).

The sleeve 203 is provided with a carrying handle 221 which is pivotable between the positions shown in FIGS. 26 and 27 respectively. The sleeve 203 is freely rotatable about its own axis relative to the inner body 202, in both the first position (FIG. 26) and the second position (FIG. 29).

It will be appreciated that the safety devices described above are applicable not only to articulated vehicles but also to rigid vehicles, with suitable modification of the brake line.

What is claimed is:

1. Apparatus for preventing a vehicle from being driven away from a loading bay during loading/unloading, the apparatus comprising:

a safety device which is complementary to a coupling on the vehicle and which when fitted to the coupling prevents the vehicle from being driven away, the safety device including a locking device which is operable to prevent removal of the safety device from the coupling and which prevents removal of a key from the locking device until the locking device is so operated, the apparatus being for use with a coupling which comprises a body provided with a face seal, a rim on one side, and a projecting spur on the diametrically opposite side, the safety device including a coupling part which is complementary to said coupling and which comprises a body portion having a rim portion on one side, for engagement with the spur of said coupling, and having a spur portion on the diametrically opposite side, for engagement with the rim of said coupling, the safety device further including an inner part connected to the rim portion of the coupling part and an outer part which is slidable between a first position, in which the coupling part is exposed for connection to said coupling, and a second position, in which the outer part is able to prevent disconnection of the coupling part from said coupling, the locking device being operable to prevent movement of the outer part from the second position, the locking device further including a locking member which is movable between a locking position, in which it is engageable in an internal recess in the outer part in the second position, and an unlocking position, in which it is not so engageable, wherein, in the first position, the outer part interferes with the key of the locking device so as to prevent turning of the key from a position in which the locking member is in the unlocking position to a position in which the locking member is in the locking position.

2. Apparatus as claimed in claim 1, for use with a vehicle having a brake supply line and a coupling assembly for connecting first and second sections of the brake supply line, the coupling assembly comprising complementary first and second couplings which are provided on the respective first and second sections of the brake supply line and which fit together to connect the first and second sections, the safety device being complementary to one of the couplings.

3. Apparatus as claimed in claim 2, the vehicle having a tractor unit and a trailer unit, the first section of the brake line being on the trailer unit and the second section being on the trailer unit, the safety device being complementary to the second coupling.

4. Apparatus as claimed in claim 1, in which the safety device includes a latching member which is mounted in the inner part so as to be movable between a latching position, in which it is engageable with an internal recess in the outer part in the first position, and an unlatching position, in which it is not so engageable.

5. Apparatus as claimed in claim 4, in which the latching member has an extension which extends into the rim portion and which is to be acted on by the spur of the said coupling to move the latching member from the latching position to the unlatching position.

* * * * *